US011891999B2

(12) United States Patent
Porras et al.

(10) Patent No.: US 11,891,999 B2
(45) Date of Patent: Feb. 6, 2024

(54) OVERMOLDED BRUSH CAPS FOR FLEX AND GASOLINE FUEL PUMPS

(71) Applicant: DELPHI TECHNOLOGIES IP LIMITED, St. Michael (BB)

(72) Inventors: Luis M. Porras, Ciudad Juarez (MX); Sarah Cruz, Ciudad Juarez (MX); Jonathan R. Martinez, Ciudad Juarez (MX); Isai Chavez, Anthony, NM (US); Hector R. Mendoza, Ciudad Juarez (MX)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 0 days.

(21) Appl. No.: 17/835,438

(22) Filed: Jun. 8, 2022

(65) Prior Publication Data

US 2023/0400028 A1 Dec. 14, 2023

(51) Int. Cl.
*H02K 5/12* (2006.01)
*F04D 13/06* (2006.01)
*H02K 5/14* (2006.01)
*H02K 13/10* (2006.01)
*F02M 37/08* (2006.01)

(52) U.S. Cl.
CPC ......... *F04D 13/0693* (2013.01); *F02M 37/08* (2013.01); *H02K 5/148* (2013.01); *H02K 13/10* (2013.01)

(58) Field of Classification Search
CPC .......... H02K 5/148; H02K 5/132; H02K 5/12; H01R 39/395; H01R 39/36
See application file for complete search history.

(56) References Cited

U.S. PATENT DOCUMENTS

| 1,588,722 | A | * | 6/1926 | Ford | F02P 1/005 |
| | | | | | 310/249 |
| 4,404,487 | A | * | 9/1983 | Nimura | H01R 39/40 |
| | | | | | 310/239 |
| 5,013,222 | A | * | 5/1991 | Sokol | F02M 37/08 |
| | | | | | 310/249 |
| 7,859,165 | B2 | | 12/2010 | Moroto | |
| 7,874,816 | B2 | | 1/2011 | Fischer et al. | |
| 9,470,181 | B2 | | 10/2016 | Fischer et al. | |
| 9,476,392 | B2 | | 10/2016 | Talaski | |
| 2004/0086403 | A1 | * | 5/2004 | Dokas | F04D 13/06 |
| | | | | | 417/423.3 |
| 2008/0298985 | A1 | | 12/2008 | Gettel et al. | |
| 2009/0297364 | A1 | | 12/2009 | Takagi et al. | |
| 2013/0119799 | A1 | | 5/2013 | Honda et al. | |
| 2015/0194864 | A1 | | 7/2015 | Harvey | |
| 2016/0333833 | A1 | | 11/2016 | Honda et al. | |
| 2020/0056571 | A1 | | 2/2020 | Fornara et al. | |

* cited by examiner

*Primary Examiner* — Dang D Le
(74) *Attorney, Agent, or Firm* — WARNER NORCROSS + JUDD LLP

(57) ABSTRACT

An improved an end cap assembly for a fuel pump is provided. The end cap assembly includes first and second brush caps herein that are overmolded onto first and second shunt wires to ensure a fluid-tight seal around the shunt wires without requiring heat staking, sonic welding, or melt flowing the end cap to the shunt wires. The brush caps are cone-shaped and include a snap-fit feature that retains the brush caps in place when the endcap assembly is transported prior to being assembled to a fuel pump body.

16 Claims, 6 Drawing Sheets

OVERMOLDED BRUSH CAPS FOR FLEX AND GASOLINE FUEL PUMPS

FIELD OF THE INVENTION

The present invention relates to fuel system components, and more particularly, an end cap assembly for an electrically driven fuel pump.

BACKGROUND OF THE INVENTION

Fuel systems for both gasoline engines and flex-fuel engines can include a lift pump within a fuel tank. Lift pumps are electrically-driven submersible pumps that provide fuel to a high-pressure fuel pump at the vehicle engine. Known lift pumps include a brush type (e.g., DC) electric motor within a cylindrical pump housing. The pump housing is sealed at its open end by an end cap assembly, and the end cap assembly includes a pair of electrical terminals for connection to a wiring harness. The electrical terminals transfer a DC voltage (e.g., 12V) from the wiring harness to a pair of DC motor brushes within the housing to energize the electric motor.

One example of a known lift pump is disclosed in U.S. Pat. No. 9,470,181 to Fischer. The DC motor brushes in this example are spring-biased to maintain positive contact with the motor armature. The lift pump includes a pair of flexible shunt wires to connect the electrical terminals to the respective brush. The shunt wires are typically sealed and held in place by melting the end cap plastic around the free end of the shunt wires. However, heat staking the shunt wires requires additional processing time and equipment, adding to the overall cost of the lift pump.

Accordingly, there remains a continued need for an improved end cap assembly that minimizes the processing time and equipment required for assembly. In particular, there remains a continued need for an improved end cap assembly that avoids the need to heat stake the shunt wires, while maintaining a fluid-tight seal around the protruding electrical terminals.

SUMMARY OF THE INVENTION

An end cap assembly for a fuel pump, for example a submersible lift pump, is provided. The end cap assembly includes first and second plugs (referred to as brush caps herein) that are overmolded onto first and second shunt wires to ensure a fluid-tight seal around the shunt wires without requiring heat staking, sonic welding, or melt flowing the end cap to the shunt wires. The brush caps are cone-shaped and include a snap-fit feature that retains the brush caps in place when the endcap assembly is transported prior to being assembled to a fuel pump body.

In one embodiment, the end cap assembly includes positive and negative electrical terminals that protrude from respective connector towers extending upward from an end cap. Each connector tower defines an elongated opening extending entirely through the end cap. An overmolded shunt wire, spring, and brush are housed within each elongated opening. The spring is positioned axially between the brush and the brush cap, and the spring biases the brush into direct electrical contact with a commutator contained in the fuel pump.

In another embodiment, a method of manufacture is provided. The method includes placing a section of a shunt wire into a mold cavity that is formed between two mold halves. The method then includes injecting an overmold resin (e.g., a nylon resin) into the mold cavity, the mold cavity having the shape of the brush cap. Once cured, the overmolded brush cap includes a frustoconical portion and an annular lip. The frustoconical portion includes a cone-shaped exterior sidewall, and the annular lip includes an outer diameter that is greater than the inner diameter of elongated opening at its uppermost extent. The annular lip includes a tapered circumferential edge, such that during assembly, the brush cap can be fully seated in the elongated opening.

In another embodiment, the brush cap is overmolded onto a shunt wire and a power lead, the power lead having a lower gauge than the shunt wire. In still another embodiment, the power lead can be inserted into an aperture in the brush cap, into contact with the shunt wire, after the brush cap is overmolded onto the free end of the shunt wire. The region immediately below the end cap assembly comprises a high pressure chamber. High pressure fuel urges the brush cap into engagement with the sloped sidewall of the elongated opening, such that the elongated opening is sealed by compression. In addition, the annular lip retains the brush cap in place when the endcap assembly is transported prior to being assembled to the fuel pump body.

These and other features of the invention will be more fully understood and appreciated by reference to the description of the embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Exemplary embodiments of an end cap assembly for a fuel pump will now be described with reference to FIGS. 1-6. As discussed below, the end cap assembly generally includes first and second brush caps that are overmolded onto first and second shunt wires, the brush caps ensuring a fluid-tight seal around the protruding shunt wires, the free ends of which comprise electrical terminals for connection to a wiring harness. The end cap assembly can be used in connection with a wide range of fuel pumps, including the fuel pump disclosed in U.S. Pat. No. 9,470,181 to Fischer, the disclosure of which is incorporated by reference in its entirety.

Figure 1:
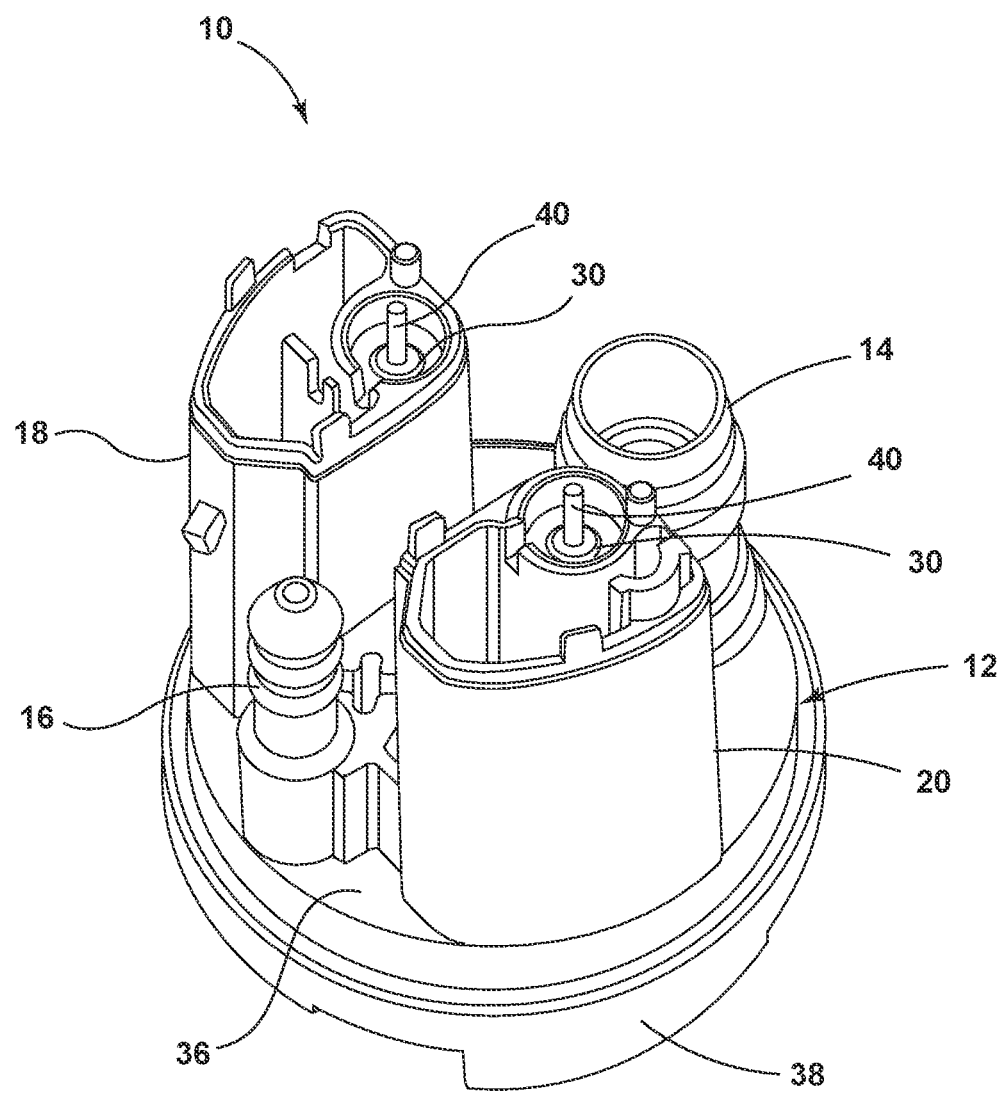
FIG. 1 is a perspective view of an end cap assembly for a lift pump in accordance with a first embodiment of the invention.
Figure 2:
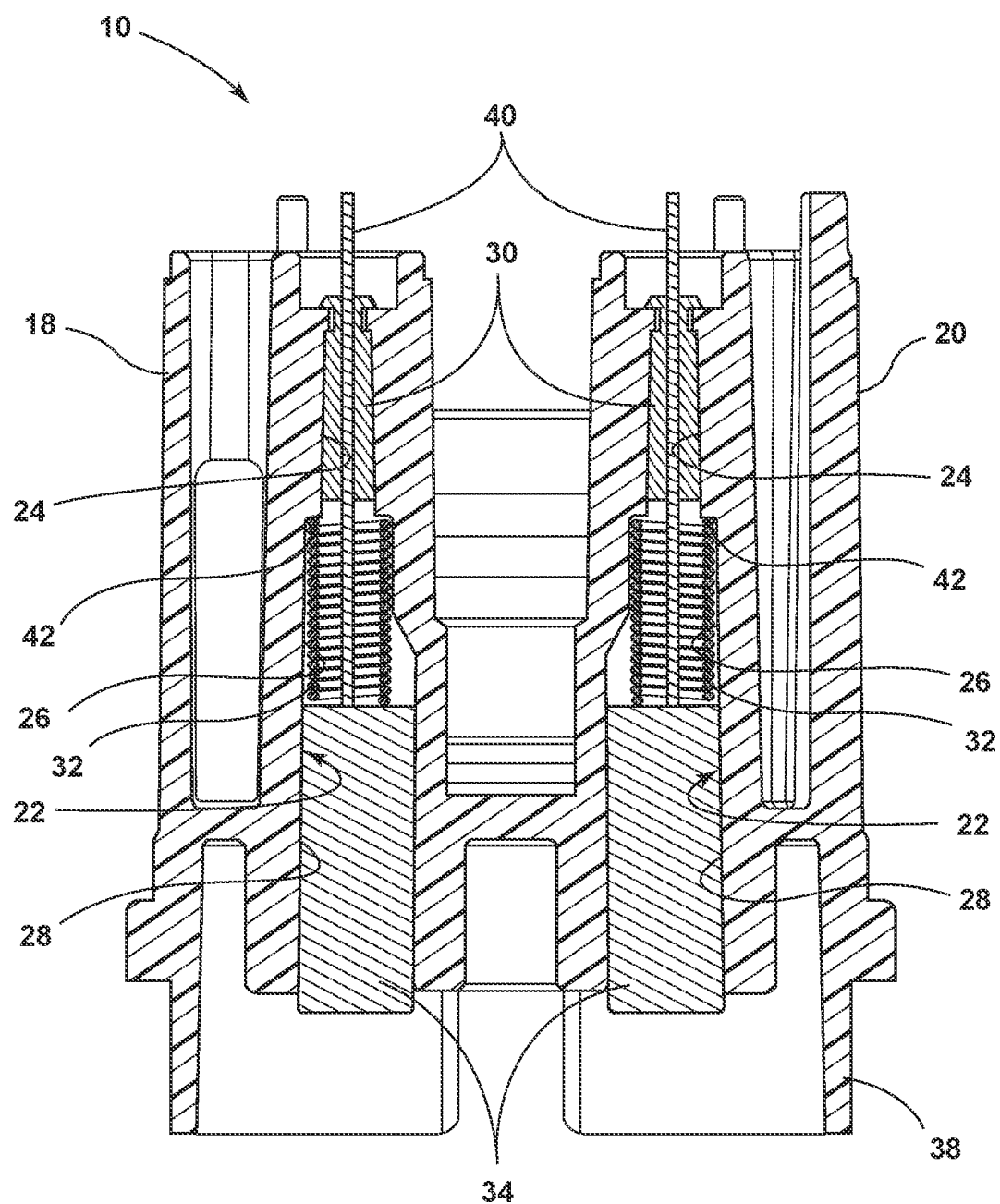
FIG. 2 is a cross-sectional view of the end cap assembly of FIG. 1, illustrating conical brush caps that are overmolded onto first and second shunt wires.
Figure 3:
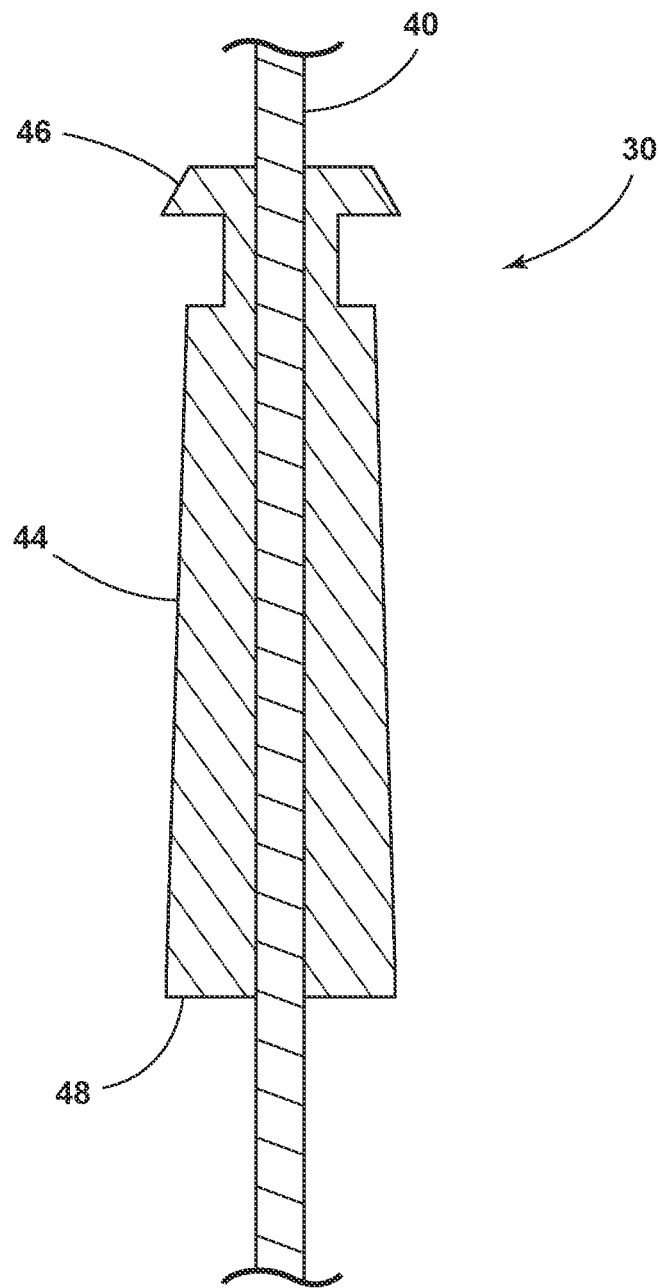
FIG. 3 is a close-up view of a conical brush cap that has been overmolded onto a shunt wire.

Referring first to FIGS. 1-3, the end cap assembly 10 is adapted to be joined to a cylindrical pump housing and includes an end cap 12 having first and second fittings 14, 16 and first and second connector towers 18, 20. The first and second fittings 14, 16 extend upward from the end cap 12 and are attachable to fuel delivery lines, such that the first fitting 14 comprises a fuel inlet and the second fitting 16 comprises a fuel outlet. The first and second connector towers 18, 20 extend upward from the end cap 12 and define an elongated opening 22 extending entirely through the end cap 12 from a first side thereof to a second side thereof. The elongated opening 22 includes a brush cap holding portion 24, a spring holding portion 26, and a brush holding portion 28. The brush cap holding portion 24 houses a brush cap 30, the spring holding portion 26 houses a spring 32, and the brush holding portion 28 houses a motor brush 34 for electrical connection to a commutator of a motor armature. The end cap 12 includes a cover plate 36 and a downward-ending skirt 38, each being integrally molded with the fittings 14, 16 and the towers 18, 20.

As noted above, each connector tower 18, 20 includes a brush 34, a brush spring 32, a shunt wire 40, and a brush cap 30. The brush 34 is contained in the brush housing portion 28 of the elongated opening 22 and is urged into contact with a commutator by the brush spring 32. The brush 34 is allowed to move axially within the brush housing portion 28 of the elongated opening 22 to maintain a direct electrical connection with the commutator. The brush spring 32 is housed within the spring holding portion 26 of the elongated opening 22. The brush spring 32 is positioned axially between the brush 34 and the brush cap 30. A first end of the brush spring 32 engages the brush 34, and a second end of the brush spring 32 engages an annular shelf 42 that separates the spring holding portion 26 from the brush cap holding portion 24. The brush cap holding portion 24 includes a conical sidewall that narrows as it transitions upwardly. As explained below, high pressure fuel within the fuel pump seals the brush cap 30 against the brush cap holding portion 24 (the conical sidewall) of the elongated opening 22, thereby preventing fuel from escaping through the elongated opening 22.

As also shown in FIG. 2, a shunt wire 40 extends from the brush 34 and protrudes from the respective tower 18,20. The brush cap 30 is overmolded onto an intermediate portion of the shunt wire 40, such that the free end of the shunt wire 40 comprises an electrical terminal. For example, an intermediate portion of a copper shunt wire can be placed in a mold cavity that is formed between two mold halves, and an overmold resin can be injected into the mold cavity, the mold cavity having the shape of the brush cap. The overmold resin is optionally a nylon resin, which is oil-resistant and is commonly used in automotive applications. The resulting brush cap 30 includes a frustoconical portion 44 and an annular lip 46. The frustoconical portion 44 includes a cone-shaped exterior sidewall, and the annular lip 46 includes an outer diameter that is greater than the inner diameter of elongated opening 22 at its uppermost extent. The annular lip 46 includes a tapered circumferential edge, such that during installation, the brush cap 30 is inserted past the entrance to the elongated opening, thereby preventing retraction of the brush cap 30.

The region immediately below the end cap assembly 10 comprises a high pressure chamber, and consequently the base 48 of the brush cap 30 is subject to fuel at relatively high pressure. The high pressure fuel urges the brush cap 30 into engagement with the conical sidewall of the elongated opening 22, such that the elongated opening 22 is sealed by compression, without heat staking, sonic welding, or melt flowing the end cap to the shunt wire 40.

Figure 4:
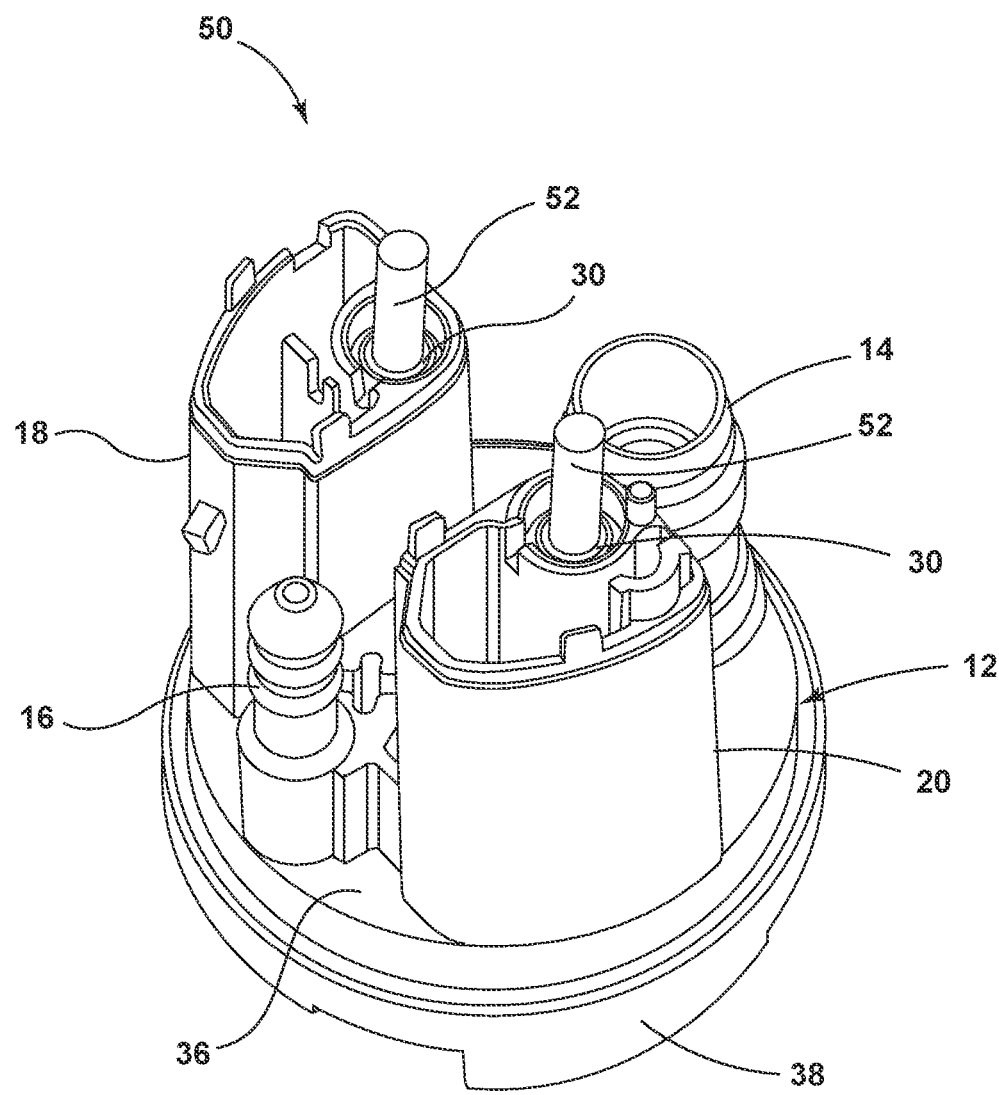
FIG. 4 is a perspective view of an end cap assembly for a lift pump in accordance with a second embodiment of the invention.
Figure 5:
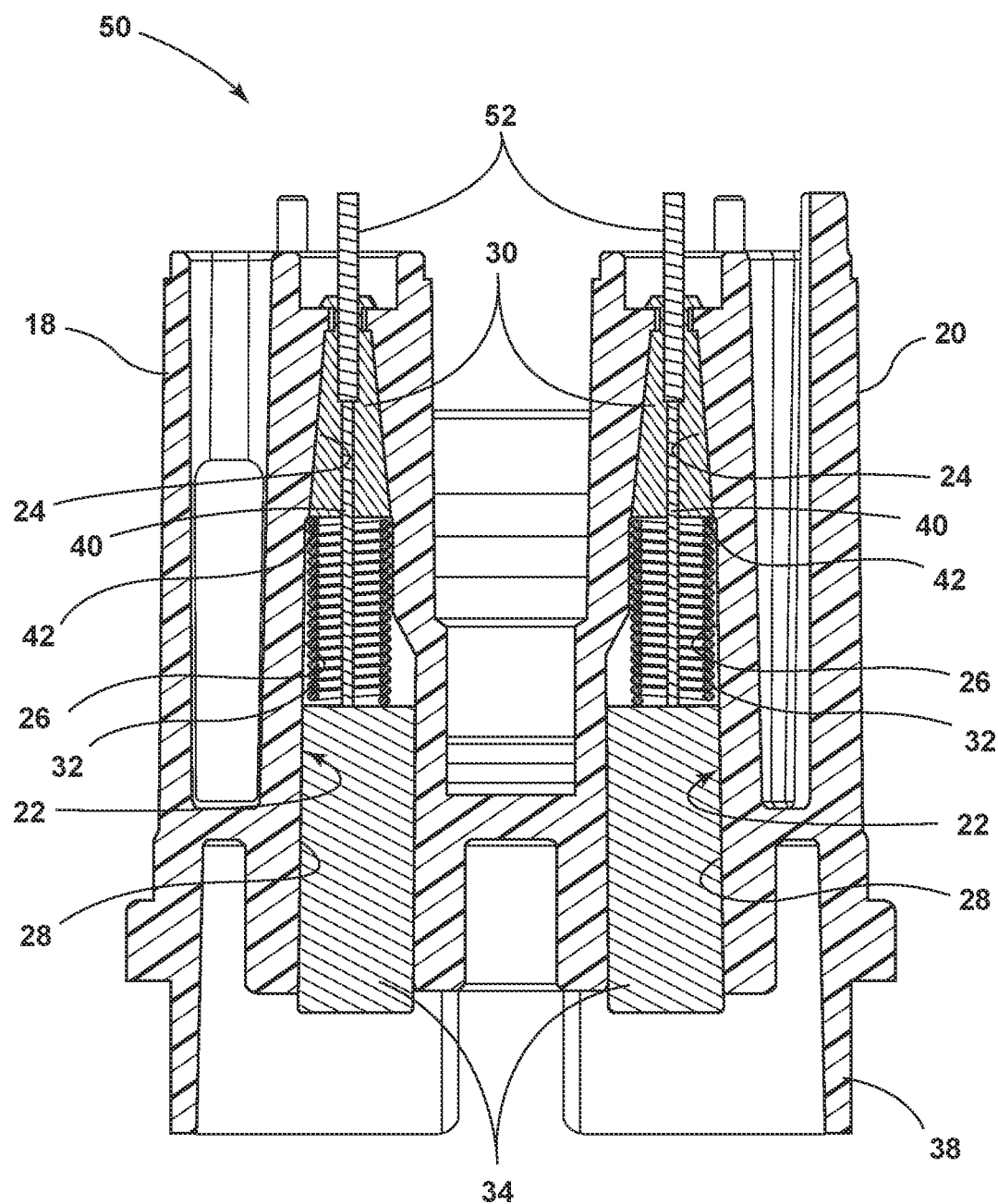
FIG. 5 a cross-sectional view of the end cap assembly of FIG. 4, illustrating conical end caps that are overmolded onto first and second shunt wires and power leads.
Figure 6:
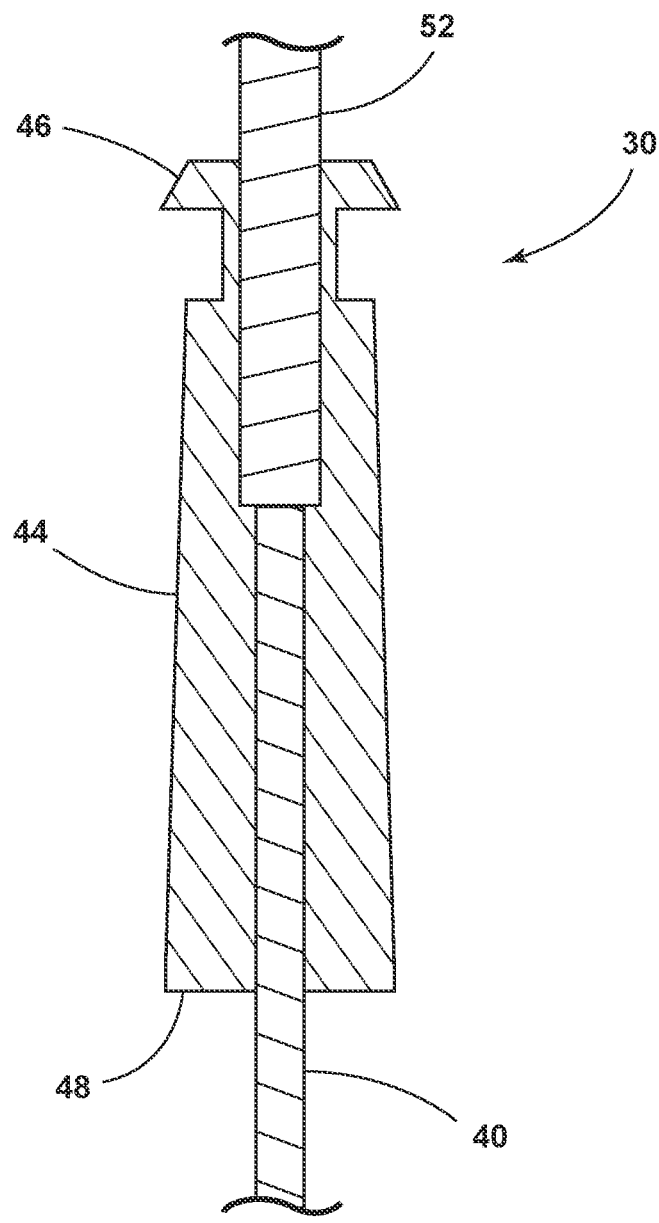
FIG. 6 is a close-up view of a conical brush cap that has been overmolded onto a shunt wire and a power lead.

Referring now to FIGS. 4-6, an end cap assembly in accordance with a second exemplary embodiment is illustrated and generally designated 50. The end cap assembly 50 of FIGS. 4-6 is structurally and functionally similar to the end cap assembly 10, except that the brush cap 30 is overmolded onto a shunt wire 40 and a power lead 52, the power lead 52 having a lower gauge than the shunt wire 40. For example, the free end of a shunt wire 40 and the free end of a power lead 50 can be soldered together and placed in a mold cavity that is formed between two mold halves. An overmold resin is then injected into the mold cavity, the mold cavity having the shape of the brush cap. The resulting brush cap 30 is overmolded onto the shunt wire 30 and the power lead 52, in particular the frustoconical portion 44 of brush cap 30. Alternatively, the power lead can be inserted into an aperture in the brush cap 30 after the brush cap 30 is overmolded onto the free end of the shunt wire 40. In each instance, the frustoconical portion 44 includes a cone-shaped exterior sidewall, which is urged against the conical sidewall of the brush cap holding portion 24 of the elongated opening 22. The brush spring 32 directly engages the base 48 of the brush cap 30, and the spring holding portion 26 of the elongated opening 22 is a continuous extension of the brush cap holding portion 24, with the brush cap 30 being enlarged to accommodate the lower gauge power lead 50.

In use, the region immediately below the end cap assembly 50 comprises a high pressure chamber, and consequently the base 48 of the brush cap 30 is subject to fuel at relatively high pressure. The high pressure fuel urges the brush cap 30 into engagement with the conical sidewall of the elongated opening 22, such that the elongated opening 20 is sealed by compression, without heat staking, sonic welding, or melt flowing the end cap to the shunt wire 40. Further, the annular lip 46 provides a snap-fit feature that retains the brush cap 30 in place when the endcap assembly 50 is transported to be assembled to the fuel pump body.

The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of any claims to the specific elements illustrated or described in connection with this embodiment. Any reference to elements in the singular, for example, using the articles "a," "an," "the," or "said," is not to be construed as limiting the element to the singular. Also, the terminologies "upper,"

"lower", "above", "below", etc. are intended for clarity of information while describing the embodiments as shown in the figures and are not to be construed as limiting the relationships between the geometric features of this invention.

The invention claimed is:

1. An end cap assembly for a fuel pump, the end cap assembly comprising:
    an end cap including first and second elongated openings extending entirely through the end cap, the first and second elongated openings being laterally spaced apart from each other;
    a positive terminal protruding from the first elongated opening and a negative terminal protruding from the second elongated opening, the positive terminal comprising a free end of a first shunt wire, and the negative electrode comprising a free end of a second shunt wire; and
    a first brush cap overmolded onto the first shunt wire and a second brush cap overmolded onto the second shunt wire, the first and second brush caps each comprising a conical plug having an annular lip at an uppermost portion thereof.

2. The end cap assembly of claim 1, wherein the annular lip includes a tapered circumferential edge having an outer diameter greater than an inner diameter of the elongated opening.

3. The end cap assembly of claim 2, further including:
    a first brush coupled to the first shunt wire and biased downward by a first spring, and
    a second brush coupled to the second shunt wire and biased downward by a second spring.

4. The end cap assembly of claim 1, wherein each of the first and second elongated openings include a brush cap holding portion, a spring holding portion, and a brush holding portion.

5. The end cap assembly of claim 4, wherein the brush cap holding portion includes a cone-shaped sidewall for engaging the conical plug.

6. The end cap assembly of claim 4, further including an annular shelf between the spring holding portion and the brush cap holding portion.

7. The end cap assembly of claim 1, wherein the end cap includes a first fitting for a first fuel delivery line and a second fitting for a second fuel delivery line.

8. The end cap assembly of claim 1, wherein the end cap includes first and second connector towers defining the first and second elongated openings, respectively.

9. The end cap assembly of claim 1, wherein the first and second brush caps are formed from a thermoplastic resin.

10. An end cap assembly for a fuel pump, the end cap assembly comprising:
    an end cap including first and second elongated openings extending entirely through the end cap, the first and second elongated openings being laterally spaced apart from each other;
    a first power lead protruding from the first elongated opening and a second power lead protruding from the second elongated opening, the first power lead being electrically connected to a first shunt wire, and the second power lead being electrically connected to a second shunt wire; and
    a first brush cap overmolded onto the first shunt wire and a second brush cap overmolded onto the second shunt wire, the first and second brush caps each comprising a conical plug having an annular lip at an uppermost portion thereof.

11. The end cap assembly of claim 10, wherein the first brush cap extends around a proximal end portion of the first power lead, and wherein the second brush cap extends around a proximal end portion of the second power lead.

12. The end cap assembly of claim 10, wherein the annular lip includes a tapered circumferential edge.

13. The end cap assembly of claim 10, further including:
    a first brush coupled to the first shunt wire and biased downward by a first spring, and
    a second brush coupled to the second shunt wire and biased downward by a second spring.

14. The end cap assembly of claim 10, wherein each of the first and second elongated openings include a brush cap holding portion, a spring holding portion, and a brush holding portion.

15. The end cap assembly of claim 14, wherein the brush cap holding portion includes a cone-shaped sidewall for engaging the conical plug.

16. The end cap assembly of claim 15, wherein the spring holding portion is a continuous extension of the brush cap holding portion.

* * * * *